Nov. 23, 1965 S. ZILBER 3,219,896
POSITION CONTROL DEVICE FOR MACHINE TOOLS
Filed June 23, 1961 3 Sheets-Sheet 1

INVENTOR.
SERGE ZILBER
BY
ATTORNEY

Nov. 23, 1965  S. ZILBER  3,219,896
POSITION CONTROL DEVICE FOR MACHINE TOOLS
Filed June 23, 1961  3 Sheets-Sheet 2

INVENTOR.
SERGE ZILBER
BY Murray Schaff
ATTORNEY.

Nov. 23, 1965   S. ZILBER   3,219,896
POSITION CONTROL DEVICE FOR MACHINE TOOLS
Filed June 23, 1961   3 Sheets-Sheet 3

INVENTOR.
SERGE ZILBER
BY *Murray Schaffer*
ATTORNEY.

3,219,896
POSITION CONTROL DEVICE FOR
MACHINE TOOLS
Serge Zilber, Chicago, Ill., assignor to American Machine
& Foundry Company, a corporation of New Jersey
Filed June 23, 1961, Ser. No. 119,145
5 Claims. (Cl. 318—31)

The present invention relates to automatic machine tools and in particular to control devices for the movable members of such machines.

The invention has as its broad primary object the provision of a novel mechanism capable of establishing a particular fixed position for a movable machine member, memorizing the position and eventually, responsive to an appropriate signal, automatically controlling the movement of the member to such fixed positions.

There is presently in use and under further development, a wide variety of automatically controlled machine tools having members capable of movement in one or more directions or modes. The present invention has application to and utility with all types of machine tools having movable members, and particular application and utility with the more sophisticated variety capable of performing rather complex tasks and work operations simulating or duplicating human functions and operations through a coordinated range of spacial modes. In order to simplify discussion, reference shall be made to such sophisticated apparatus to show in detail the need for and application of the present invention, it being understood from the outset, however, that the present invention is not limited solely thereto.

In the co-pending application of Johnson, et al., S.N. 43,090 filed July 15, 1960, there is described a machine tool having a work performing member capable of coordinated motion in a plurality of spacial modes or axes. Briefly, the machine comprises a rotatable standard on which is mounted a vertically and horizontally movable work arm, actuating means for moving the standard and the arm, and servomechanism for controlling the movement thereof in coordinated program. In order to effect the controlled operation of the machine, the servomechanism is manually operated through a desired pattern necessary to effect a work program. As the machine is thus operated, the movements of the several actuated parts of the machine are recorded, for example, as electrical signals on a tape which may then be used to control the same mechanisms and parts, in playback for the repetitive automatic operation of the machine. It will be understood that the work arm of this device is capable of rather unlimited spacial movement along at least three axes described, within the confines set by its physical structure, and that it may be manipulated to start from any position within its range, moving in any direction in the performance of its programmed work and likewise end its movement at any position.

While the manual or recorded commands may be utilized to establish any number of fixed positions for the movable member, there is often need for an independent position command for establishing a limited number of fixed positions. This is true particularly in the type of machine described where it is essential, in the process of programming a work cycle for continuous and repetitive operation, that the end point of the cycle coincides with the starting point of the cycle, in order that the succeeding cycles be repeated in space exactly like the one manually programmed. Because the initial program is manually produced, the likelihood that the terminal point can be programmed to accurately coincide with the initial point is small. To obtain this accuracy, independent preset position command is therefore required. An independent fixed position command is also advantageous to re-orient the machine should it, during its repetitive operation, wander, malfunction or otherwise be distributed or interrupted in its cycled program.

It is an object of the present invention to provide the means for establishing fixed programmed locations for each of the moving axes of a machine tool, and to provide position command information for controlling a movable member to such fixed position which is independent of the information obtained from the manual controls or any recorded program control which normally provide the position command signals.

It is another object of the present invention to provide alternate position command means establishing fixed programmed locations which may be used in conjunction with and supplementary to the normal position command means. It being a part of this objective to provide means which are free of any of the distortions or errors encountered in manual or recorded operation or programming of machine tools.

It is an object of the present invention to provide independent fixed position program control means which may be used both in initially programming a machine tool for a work operation and in the subsequent repetitive playback operations.

It is an object of the present invention to provide, in a machine tool having a member capable of movement in a coordinated three dimension spacial program, means for establishing an initial fixed position in space to which the member may be moved during its program or returned after completing its program.

In general, in accordance with the invention, there is provided a mechanism comprising a pair of relatively moving elements; the first of which being selectively positionable in any number of fixed locations; the second being movable in response to the movement of the machnie tool operating member, such as the aforementioned arm, so as to assume a unique location corresponding to each position transversed by the operating member along any particular axis of its movement. The second element is mounted to come into contact with and actuate a variable signal producing device secured to the first element. The variable signal device produces oppositely phased signals dependent on the relative displacement of the two elements and a null or no signal when the elements assume a predetermined relative orientation. Since the second element is responsive to the position of the operating member, the signal obtained by the relative orientation of the two elements is, therefore, a function of the actual position of the operating member with respect to the preset initial or desired position. Since the first element is positionable selectively, the null position can of course be preset at any location corresponding to any position of the machine tool operating member.

During the operation of the machine when a signal is obtained from this device, it can be used to control and reposition the operating member (consequently re-orienting the relative elements of the device) until an absence of signal or the null position is obtained.

A complete description of the present invention follows. From it the advantages and objects enumerated, as well as others, will become apparent. It should be remembered that while reference has been made to a particular form of machine tool, the present invention is not limited in application thereto.

In the description reference is made to the accompanying drawings wherein.

Figure 1:
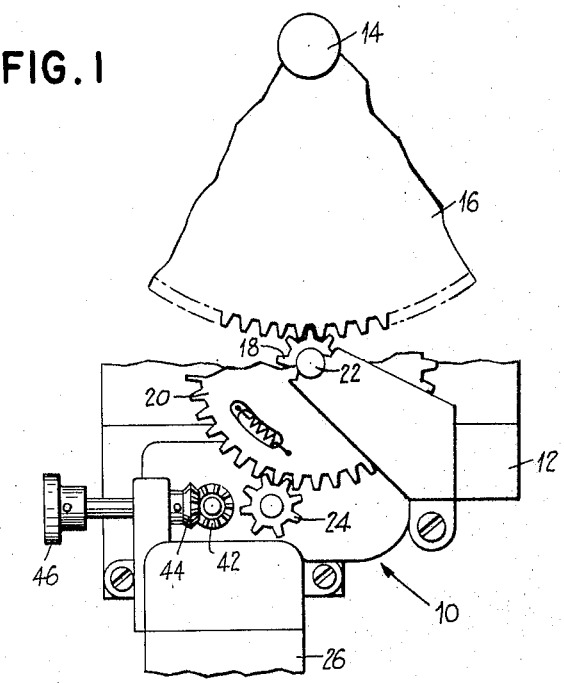
FIG. 1 is a plan view, partially broken away, of the device embodying the present invention used in conjunction with a rotary movable member.
Figure 2:
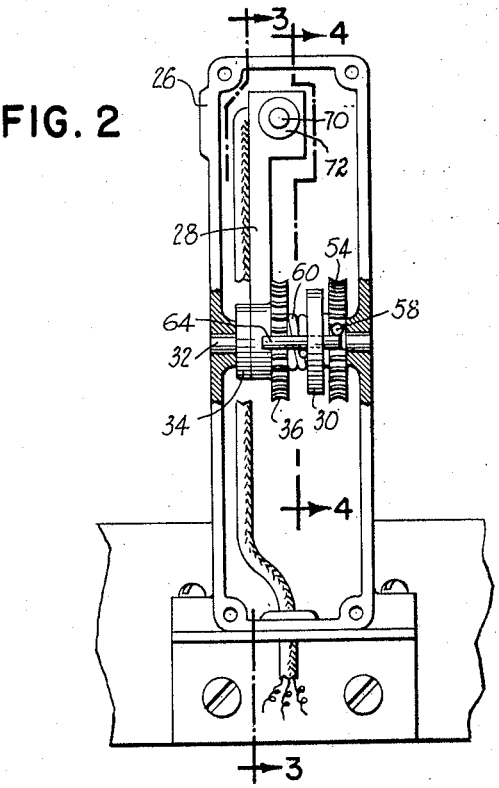
FIG. 2 is an end elevation of the interior of the device in cross sectional view.

Referring now to FIG. 1, a device 10 embodying the concepts of the present invention is shown mounted to the frame 12 of representative machine tool for the direct control of its movable member 14 which, in order to simplify the description at the present time, is represented as a vertical column 14 rotatable about its central axis. Affixed to column 14 is a gear 16 for transmitting a change in position of the column to the control device 10. Anti-backlash gears 18 and 20, suitably biased and affixed to shaft 22, are provided to effect a reduction of speed from the column 14 to the control device 10, without any loss of accuracy. It will be shown later how the present invention is equally suited for machine tool members moving along linear axes.

As seen in FIGS. 2–5, the control device 10 is located within a substantially hollow semi-circular housing 26 and comprises a pair of relatively movable lever elements 28 and 30 mounted for arcuate movement about a common shaft 32. The first or reference lever 28 is adapted to be selectively positionable and when so positioned, to remain fixed in any location within its arc of travel by connection to a manually operated screw adjustment mechanism. Secured to the hub 34 of lever 28 is a gear 36 engaging a worm 38 which is affixed to a shaft 40 extending outwardly of the housing 26. To facilitate manipulation of the worm 38 and gear 36, shaft 40 has secured to its outward end a bevel gear 42 meshing with a corresponding bevel gear 44 connected to a thumb screw 46. Mounted at the free end of the reference lever 28 is a signal producing device 48 which will be described in greater detail later.

The second position lever 30 is adapted to be actuated in response to and is displaced simultaneously with the movement of the rotary tool member 14. The movement of the column 14 is transmitted through the aforementioned reduction gear train to an input gear 24 affixed to shaft 50. Worm 52 and gear 54, similar to that used for locating the reference lever 28, is provided to orient the position lever 30. Worm gear 52 is independently rotatable about shaft 32 and has extending radially from its edge a pin 56 which is adapted to engage a pin 58 extending axially from the position lever 30. The position lever 30 follows the movement of gear 54 by the force of spring 60 which has one end 61 wrapped about shaft 32 and secured in a recess (not shown) in gear 36 and its other end held under a small pin 62 extending axially outwardly from the side of lever arm 30 at its extremity. Extending axially outwardly of the lever 30, at its extreme end, is a pin 64 which is aligned to contact the signal control device 48 when the displacement of the two levers are within a predetermined range.

From this construction, it is evident that the levers are only restrained by the worm gear drives in the direction of increasing angular orientation of the two levers 28 and 30. In the other direction, i.e., of decreasing angular orientation, the force of spring 60 is designed to be overcome by the contact of pin 64 with the reference lever 28, so that the rotation of the column 14 transmitted to the position lever 30 cannot dislodge the reference lever 28 from its selected fixed position.

From the foregoing description, it is seen that the reference lever 28 and position lever 30 are angularly oriented relative to each other in response to either the manual manipulation or through the movement of the column 14. However, during operation of the machine, the position lever 30 constantly and simultaneously assumes a location which is a function of the actual position of the rotating column with respect to its central axis while, on the other hand, the reference lever remains fixed at its pre-selected location. Thus, during operation, the actual orientation of the position lever 30, with respect to an initial or desired preset position of the reference lever, represents a corresponding change in displacement of the rotating column 14. The signal generating device 48 is provided to produce an electrical signal indicating the orientation of the position lever 30 and the error between the initial or desired reference point of the column and its actual momentary position.

Figure 9:
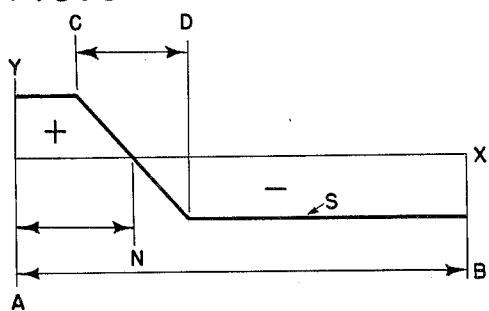
FIG. 9 is a graph of the position command signal of the present device against the desired position setting of the movable tool member.

The signal generating device 48 comprises a linear transformer of the movable core type. A suitable device of this type is manufactured by the Schaevitz Company of Pennsauken, New Jersey, and which because of its wide acceptance is commonly referred to by the manufacturer's name. The core 70 of the Schaevitz unit 48 is spring loaded outwardly. When fully depressed, the end of the core will lie flush with the end face 72 of the Schaevitz unit housing. The unit produces a constant uniform signal of one phase when the core 70 is fully extended and a constant uniform signal of opposite phase when the core is fully depressed. At a point between the two extremities of the core excursion, the unit has a null condition where it does not provide any signal whatsoever. Between the null position and the fully extended position and between the null position and the fully depressed position, the unit provides a signal proportional to displacement of the core from its extremity. The signal produced by this type of unit is shown graphically in FIG. 9 wherein the distance between points A and B represents the full stroke or excursion of the Schaevitz unit core 70; the distance between points C and D represent that portion of the stroke in which a proportional signal is given; and point N represents the position of the stroke of the core at which a null or absence of signal is obtained.

Figure 3:
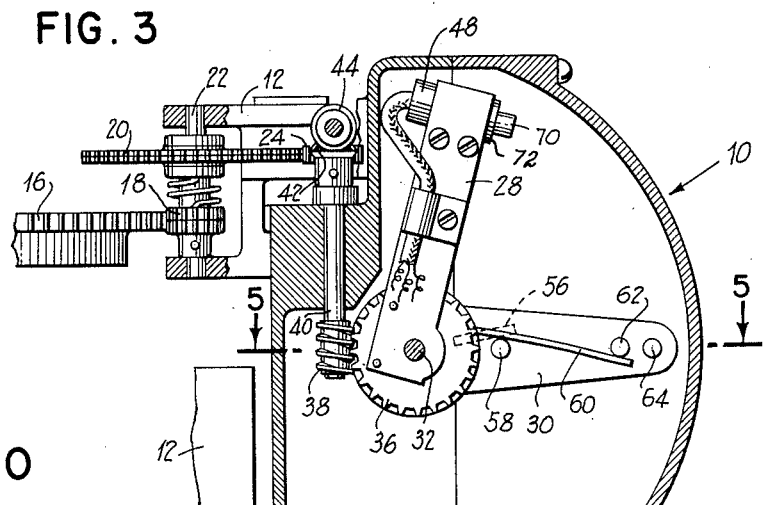
FIG. 3 is a cross sectional view of the device, taken along line 3—3 of FIG. 2.

The Schaevitz unit 48 as seen in FIG. 3 is mounted at the extremity of the reference lever 28 so that the core 70 is in alignment with the pin 64 axially extending from lever 30. The core 70 is thus capable of being actuated by the pin 64 when the levers 28 and 30 are within the range bounded by the excursion of the core 70. Beyond either limit of the excursion of core 70, the relative orientation of the position lever 30, and consequently the displacement of the column 14, is of little importance since in any case the Schaevitz unit will provide a maximum uniform signal. For example, when the position lever 30 is in the orientation shown in FIG. 3, a constant uniform signal is obtained independent of the distance between the levers. When the position lever 30 is, in response to the movement of column 14, moved toward the reference lever 28 and the pin 64 comes into contact with the core 70 of the unit 48, the core is displaced, decreasing the signal proportionally to the displacement of the core. Continued movement of the position lever 30 displaces the core toward the null condition. Continued displacement, again in response to the movement of the column 14, beyond the null condition gives an increasing signal of opposite polarity until the core is fully depressed whereupon the signal reaches its maximum constant value. At the point where the core 70 is fully depressed, the pin 64 engages the face 72 of the Schaevitz unit. While continued displacement of the column 14 would cause a corresponding movement of worm 52 and gear 54, the force of spring 60 is overcome, thus preventing displacement of reference lever 28 by position lever 30. Since a uniform signal is thereafter obtained, it is unnecessary for the position lever 30 to continue to follow the movement of the column 14 beyond this point. Returning to the graph of FIG. 9, it can now be observed that the amplitude of the signal, represented on coordinate Y is the function of the error between the desired position of the column 14 and its actual position at any moment represented on coordinate X.

It is clear that the pre-selection of the positions of levers 28 and 30, so that the null condition of the generating device is obtained, will thereafter establish a fixed initial or desired location for the column 14 which may be returned to at will independent of any interim movement. The pre-selection may be made by either placing the column and consequently the position lever 30 at a desired location and adjusting the thumb screw mechanism to locate the reference lever 28 at the null condition or by first pre-setting the reference lever 28 at a desired location and then displacing the column 14 (and position lever 30) to obtain the null condition. Thereafter the angular orientation of position lever 30, resulting in a uniformly constant error signal, either positive or negative, dependent upon direction, will indicate a relatively large displacement of column 14, from the desired position while a proportional error signal (either positive or negative) will represent a relatively small displacement. Both these signals may of course be utilized to control the movement of the column for return to the desired position or until the null condition is reached.

The value in having a generating device producing both a proportional error signal and a uniformly constant error signal lies in the fact that the constant signal may be used to control the gross movements of the column while the proportional signal is used to control the fine movement of the column as it nears the desired fixed position or the null condition. It is desirable that the proportional control of the tool be over an excursion sufficiently small for quick but accurate operation of the tool, but large enough to prevent instability. The size of the proportional region will of course be dependent upon the full excursion desired in the machine tool; signal generating devices of the type necessary being obtainable in nearly any size required.

Figure 8:
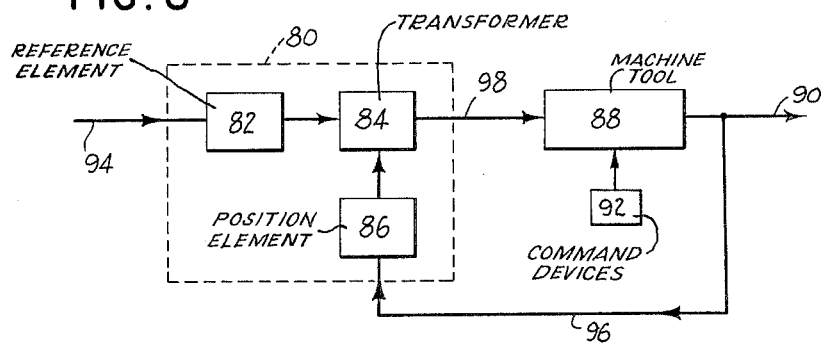
FIG. 8 is a block diagram showing the use of the present invention in a closed loop servo control system.

The block diagram of FIG. 8 shows graphically the application of the device of the present invention in a closed loop servo control system for a machine tool. The dotted enclosure 80 contains the apparatus of the present invention comprising the reference element 82, the Schaevitz transformer 84, and the position element 86. The larger solid line enclosure represents the machine tool 88 containing the necessary mechanical and electrical equipment for operating the extended movable member represented by arrow 90. The smaller solid line enclosure 92 contains the normal position command devices for controlling the member 90. The mechanical input for the reference element 82 is fed into the device through line 94, while the mechanical input for the position element 86 is fed back, from the movable member 90, through line 96. The inputs to both reference and position elements 82 and 86 respectively are compared and integrated as previously discussed by the signal generating unit and a signal 98 is obtained indicative of the orientation. Appropriate switching apparatus (not shown) is of course employed to selectively alternate between the signal of the normal position command 92 and the signal 98 of this device for controlling the movable member 90.

Typically, the present device may be used to establish an initial or desired reference position or location for the movable member 90. The member may be then conducted through the prescribed cycle of motions controlled by the normal position command signal device 92. When this operation is completed, or in the event it is interrupted for any reason, the present device may be switched on to provide a completely independent control for the movable member and return the member to the initial or desired reference location. So long as the reference element 82 is not re-oriented, the device will continue to memorize the pre-set reference location no matter what the interim movement of the machine tool has been or no matter how many times the device itself has been switched into the servo loop to independently control the movable member 90.

In machine tools, where the movable member operates along more than one spacial axis, it is obvious that a number of devices of the present invention may be employed, each to control the member in a particular axis. By the coordinate use of a multiple of these devices, the machine may be made to retain reference to a three dimensional spacial location. Additionally, a number of devices of the present invention may also be employed to provide a number of reference positions, such as in tandem, along a single axis so that a number of discrete reference locations may be retained.

Figure 6:
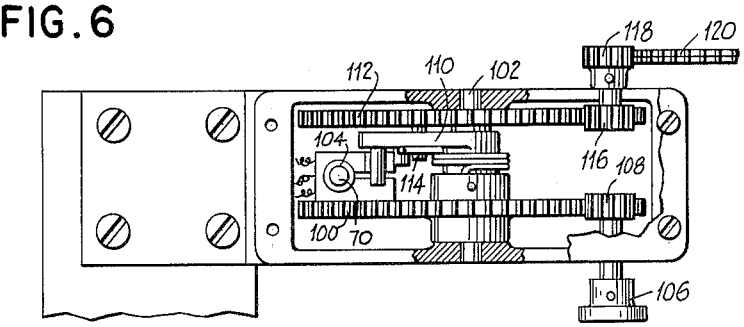
FIG. 6 is a modified form of the device of this invention shown in plan view, partially broken away.
Figure 7:
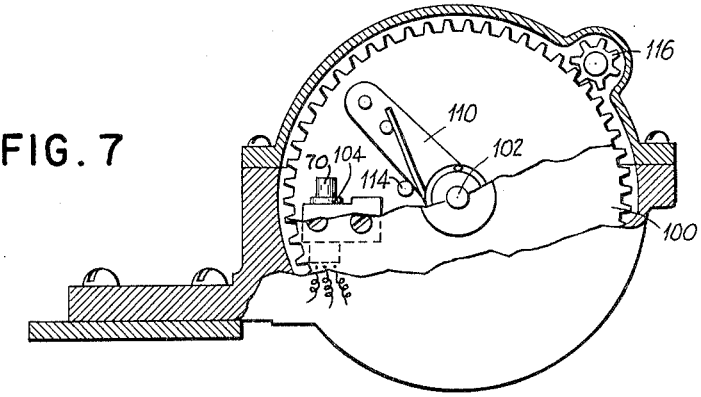
FIG. 7 is a side elevational view of the device shown in FIG. 6.

FIGS. 6 and 7 show a modified version of the device of the present invention wherein the reference element, rather than being a lever or an arm, is an enlarged gear 100 adapted to rotate about a shaft 102. The transformer of Schaevitz unit 104 is affixed directly to the inner face or gear adjacent its periphery. The reference gear 100 is manually positionable by thumb screw 106 connected to small spur gear 108. The position element, lever arm 110, is formed similarly to the position lever 30 previously described and is mounted about shaft 102 in the same manner. The position lever 110 is driven by gear 112 which is also rotatably mounted on shaft 102. Gear 112, while functioning in a manner similar to that of the previously described position lever gear 54, is larger than gear 54 and has its position lever engaging pin 114 extending axially from its inner face. Gear 112 is driven through gear train 116, 118 and 120 directly from the machine tool movable member (not shown).

The apparatus shown in FIGS. 6-8 functions in exactly the same manner as the apparatus previously described. The use of enlarged gears, however, tends to simplify the mechanical structure of the device and permits the use of a somewhat less complex gear driving mechanism. In certain circumstances, such a structure may be preferable.

Figure 10:
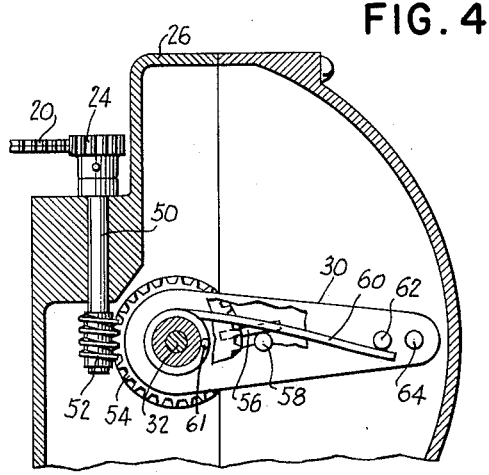
FIG. 10 is a plan view, partially broken away, of the device of the present invention used in conjunction with a reciprocating movable member.
Figure 4:
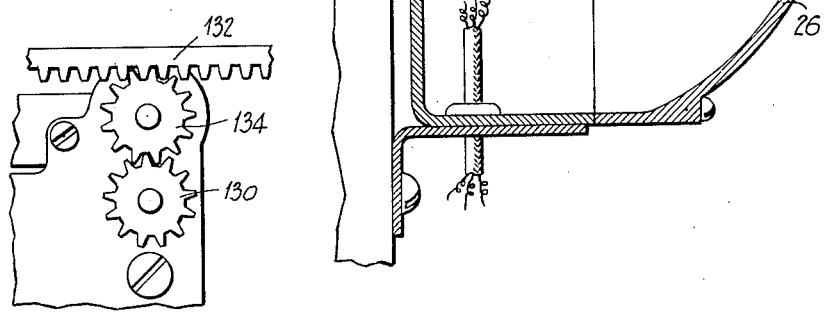
FIG. 4 is a cross sectional view of the device taken along line 4—4 of FIG. 2.
Figure 5:
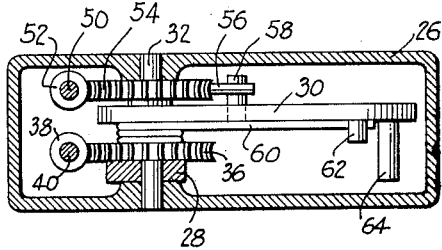
FIG. 5 is a sectional view of the device taken along line 5—5 of FIG. 3.

FIG. 10 shows the manner in which the present invention may be utilized with machine members movable in a reciprocal linear axis rather than about rotary axis. Spur gear 130 may be either the input gear 24 shown in the apparatus of FIGS. 1-5 or the input gear 118 of the apparatus shown in FIGS. 6-8. The motion of the movable member (not shown) is transmitted to the input gear 130 by a rack 132 to which it is directly connected. An intermediate gear 134 is shown to facilitate the transmittal of this motion. It will also be obvious to those skilled in the art that other means may be employed for transmitting motion of either a rotary or linear type to the device of the present invention than those shown. It being the object of the description to show only a representative means of doing this.

It will thus be seen that the objects set forth above, and those made apparent from the preceding description, are efficiently attained. As various changes may be made in the form, construction and arrangement of the parts herein without departing from the spirit and scope of the invention and without sacrificing any of its advantages, it is to be understood that all matter herein is to be interpreted as illustrative and not in a limiting sense.

What I claim is:

1. In an automatic machine having a movable member and electrically operated means for actuating said member, apparatus for providing a position command signal for controlling said machine member in a predetermined axis, comprising, a pair of relatively movable elements, one of said elements comprising a signal producing device said device having actuating means for varying the signal output thereof and the other of said elements comprising means for varying the signal output of said device when in engagement with said actuating means, means for manually setting said first mentioned element in any one of a plurality of fixed locations, means for moving said second mentioned element in response to said machine member to assume a plurality of unique positions corresponding to each position traversed by said member in said axis, said controlling means being normally out of engagement with said actuating means and in engagement with said actuating means only when said movable elements are in close proximity with each other, said elements being adapted to be initially set with respect to each other in accordance with the position of said machine member to produce an initial signal and subsequently a signal indicative of the change in position of said machine member in said axis, and means for employing said signal to actuate said machine operating means to control said member.

2. Apparatus according to claim 1 including means for controlling the movement of the machine member in responsive to the signal obtained.

3. The apparatus according to claim 1 wherein said signal producing device is a variable transformer having a null signal position and a range of oppositively phased signals dependent upon the relative displacement of the signal control means.

4. The apparatus according to claim 1 wherein said elements each comprise an arm independently mounted about a common axis for relative angular movement.

5. The apparatus according to claim 1 wherein said elements each comprise a disc independently mounted about a common central axis for relative angular movement.

References Cited by the Examiner

UNITED STATES PATENTS

| | | | |
|---|---|---|---|
| 1,959,803 | 5/1934 | Wittkuhns | 318—31 X |
| 2,417,821 | 3/1947 | Harcum | 318—31 X |
| 2,564,221 | 8/1951 | Hornfeck | 318—19 X |
| 2,760,133 | 8/1956 | Shaw | 318—31 |
| 2,870,387 | 1/1959 | Brand | 318—32 |
| 2,999,198 | 9/1961 | Schlick | 318—512 |

ORIS L. RADER, *Primary Examiner.*

MILTON O. HIRSHFIELD, *Examiner.*